Patented Oct. 29, 1940

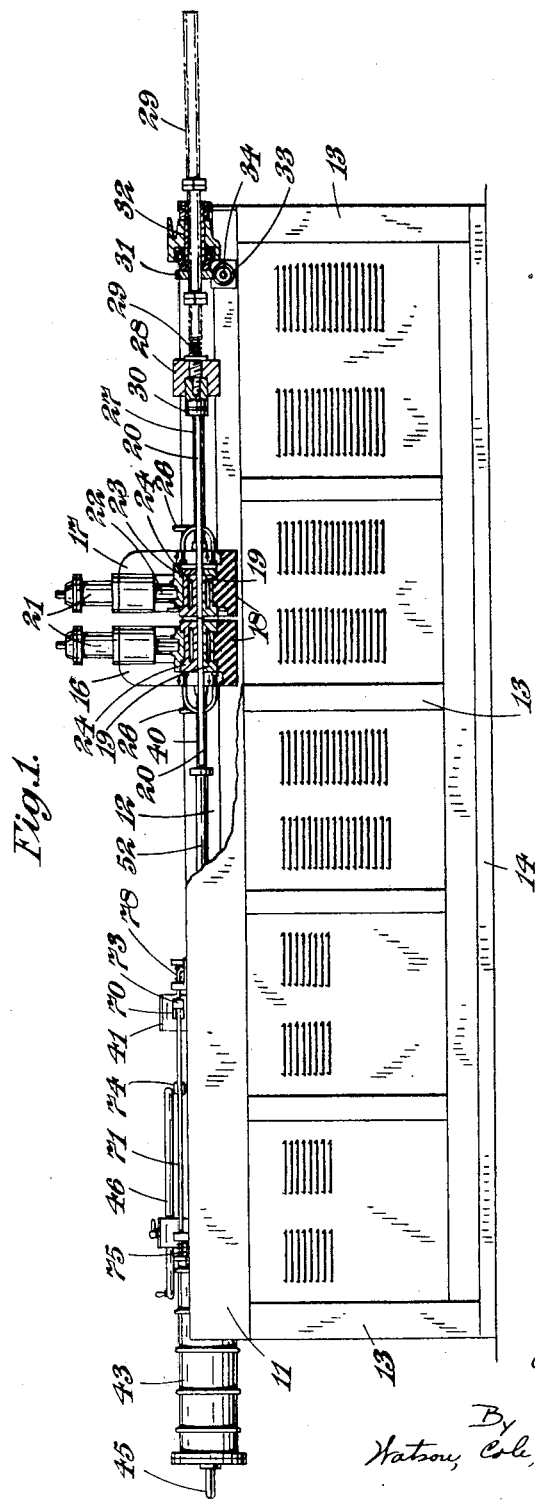

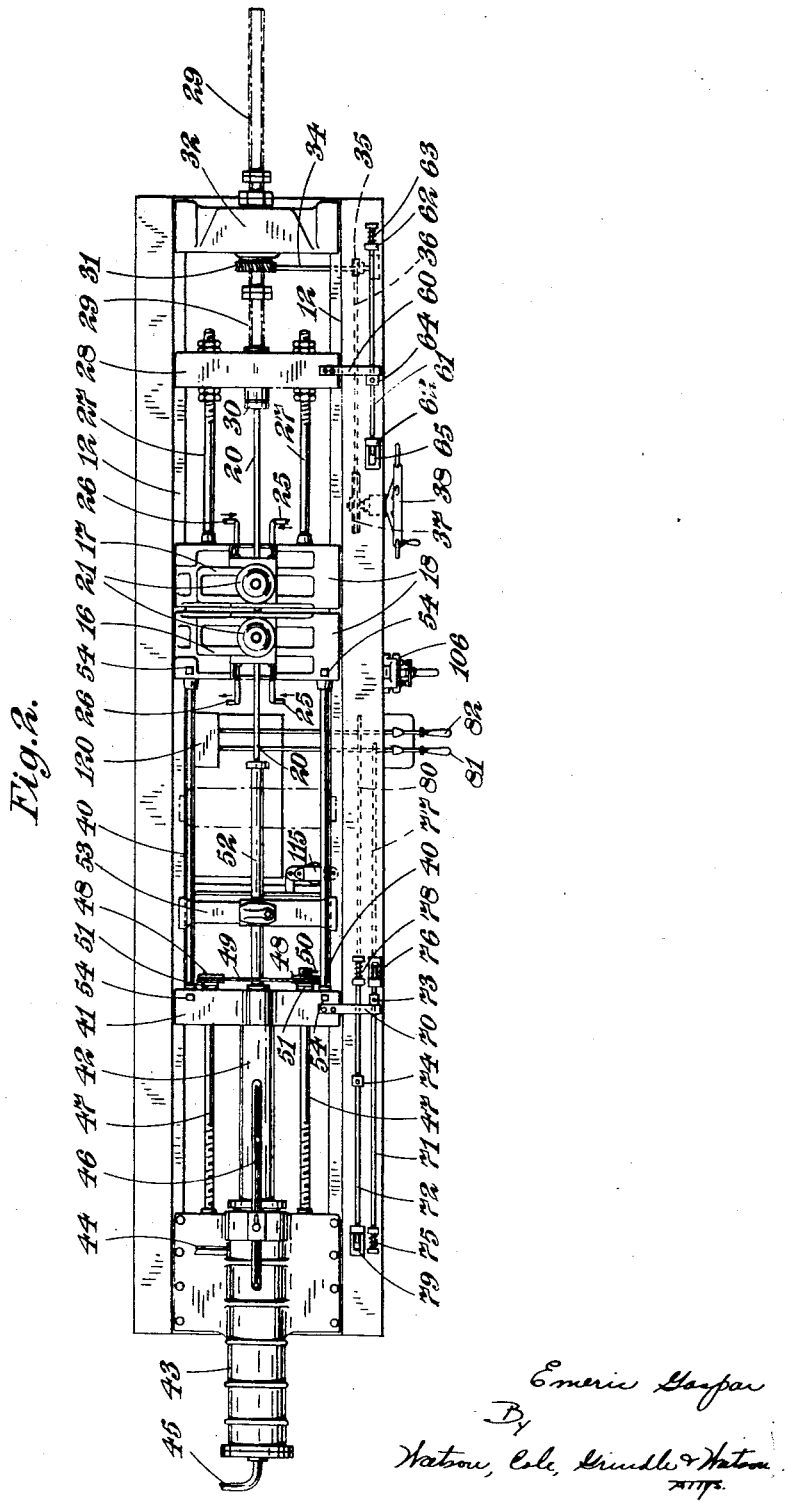

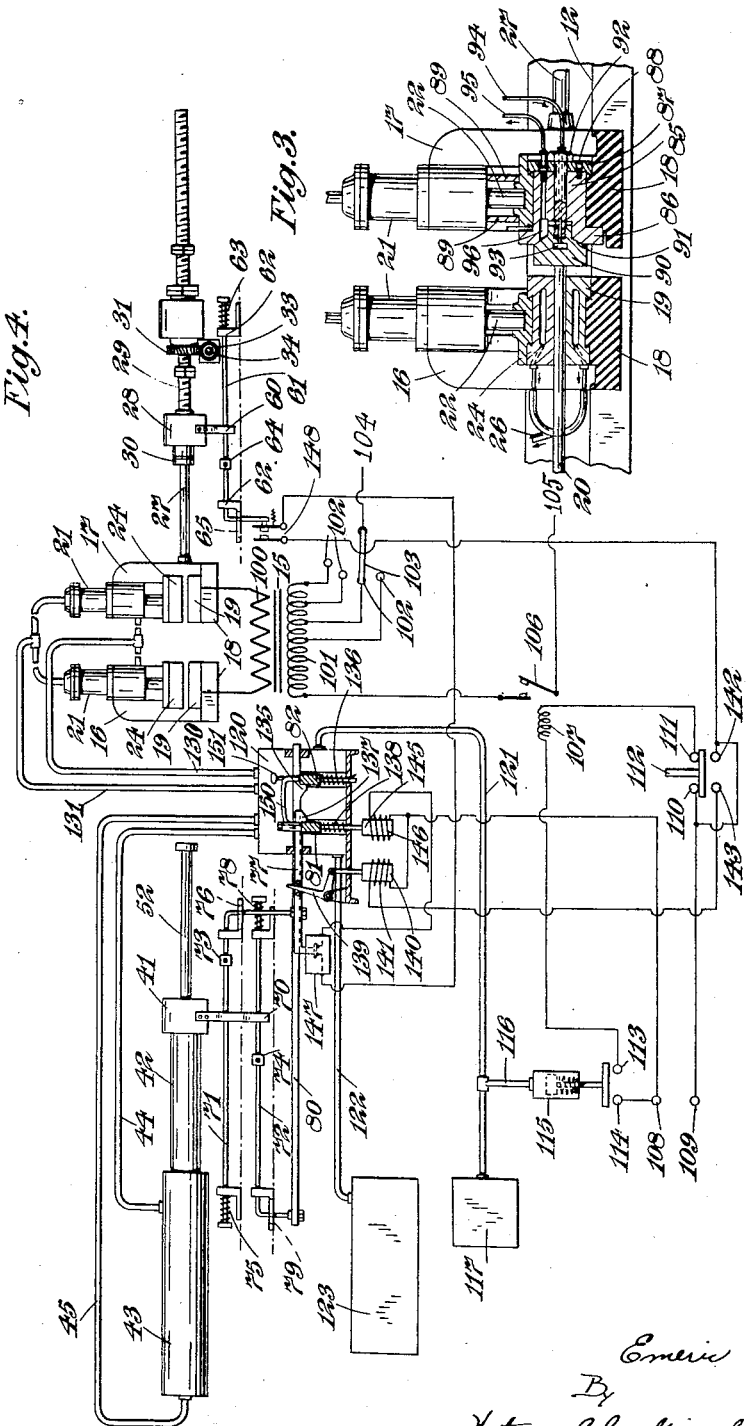

2,219,279

UNITED STATES PATENT OFFICE 2,219,279

MACHINE FOR WELDING AND FORGING METALS

Emeric Gaspar, London, England, assignor to Omes Limited, Barnes, London, England, a British company Application June 30, 1939, Serial No. 282,245
In Great Britain April 13, 1938

2 Claims. (Cl. 219—3)

This application was filed in Great Britain on April 13, 1938.

This invention comprises improvements in or relating to machines for electric working of metals, and the invention is hereinafter described as embodied in an electric forging machine which can also be employed for electric welding operations.

In electric flash or butt welding the welding operation proceeds in two stages, namely the first stage in which, when the pieces to be united are brought together, the current is employed in heating the workpieces at the joint and in melting the metal on the surface where it is to be united, and the second stage in which the pieces are forced together to effect their union. In the first stage a gradual approach of the pieces to be united, with a light pressure, is required, whereas in the second stage a relatively rapid movement under a heavy pressure is called for. These two movements are usually effected by a cam device, the cam having a slow motion portion over the heating stage and a change in its contour at an appropriate point to bring about the extra motion required for union.

In electric forging machines the workpieces are held so that they extend between two electrodes and are heated by a current passing through them from one electrode to the other, the workpiece being either pressed through one electrode towards the other so as to cause a bulge on its end or at an intermediate point of its length, or, again, the workpieces may be subjected to tension so as to cause them to be thinned out to a neck, or actually broken, leading to the production of two pointed workpieces.

In electric welding, as in electric forging, a step-down transformer is ordinarily adopted for supplying current to the electrodes, but the voltage required in the case of electric welding is higher than in the case of electric forging.

It is an object of the present invention to provide a machine which is capable of both welding and forging operations as may be desired, and in the preferred form of the machine hereinafter described both upsetting and stretching operations can be conducted as well as welding, but it is to be understood that it is not essential, in accordance with the invention, that every kind of electric forging operation as well as welding should be capable of being conducted in the machine.

According to one feature of the invention a combined butt welding and forging machine comprises in combination a bed, two vice electrodes, two feed devices one for preliminary moving one vice electrode and the other a heavy-pressure feeder provided with a ram to engage the ends of workpieces to force them through the second electrode for upsetting or welding operations and a regulatable transformer connected to the electrodes, the voltage variation of which is adequate to enable it to suit both welding and forging operations.

The first said vice electrode which is connected to the preliminary feed-device may be adapted to receive an anvil electrode for end-upsetting when desired.

A trip or switch may be provided operated by the preliminary feed-device or a part moving therewith, the said trip or switch serving to control the heavy-pressure feeder so as to bring it into action automatically after a predetermined degree of movement of the preliminary feed-device.

Preferably the heavy-pressure feeder consists of a hydraulic cylinder and ram.

The heavy-pressure feeder may be provided with an adjustable stop for automatically terminating its feed movement in any desired position.

The heavy-pressure feeder may, moreover, be provided with means to connect it to the said second electrode when desired so as to cause the electrode to move along the bed and be made reversible, that is to say capable of exerting feeding force in both directions, so that tension-forging operations can be conducted if desired. Preferably it has an adjustable reversing device for automatically reversing its feed movement towards the vice electrodes at a position corresponding to the position of adjustment of the reversing device.

One example of a machine constructed in accordance with the invention will now be described with reference to the accompanying drawings, in which:

Figure 1 is a side elevation of the machine, certain parts being shown as broken away or in section;

Figure 2 is a plan of the same;

Figure 3 is an enlarged view of the electrodes showing an anvil located in one of them for upsetting purposes, and Figure 4 is a diagrammatic representation of the working parts and of the hydraulic and electrical connections thereof.

The machine comprises a horizontal bed plate 11 provided with longitudinal guideways 12 and arranged above a frame consisting of vertical members 13 and a horizontal base 14. The frame contains an electrical step-down transformer which is shown diagrammatically at 15 in Figure 4 of the drawings, together with appropriate control gear, including means for the supply of oil under pressure for operating the hydraulically controlled portions of the apparatus.

Upon the bed plate 11 there are disposed two slidable work-holding electrodes 16, 17 in the form of vices. The vices 16, 17 are in their essentials similar to one another. They each comprise a base 18 mounted so as to slide on the guideways 12. The base of the vice 17 is insulated from the machine bed plate. The base 18 is shaped to support a lower vice jaw 19 which is interchangeable and is adapted to fit closely upon a workpiece 20. Each of the bases 18 is connected to one of the terminals of the transformer 15 by flexible leads and the bases and the vice jaws are made of a material which is a good conductor of electricity, such as bronze, so as to convey current to the workpieces 20 efficiently. The vice frame in each case rises behind the vice jaws to a height above the workpiece where it carries a hydraulic cylinder 21 arranged with its axis vertically above the lower vice jaw 19 and having a ram 22 which carries a movable upper vice-jaw holder 23 in which is supported an upper vice jaw 24.

The two vices 16, 17 are arranged with their vice jaws in line with one another considered in a direction parallel to the guideways 12 of the bed plate, and the vice jaws 19, 24 are made hollow and provided with cooling water connections 25, 26 (Figure 2).

The vice 17 is connected by a pair of struts 27 to a sliding head 28 which runs on the guideways 12 and is secured to a screwed feed rod 29. The struts 27 are insulated from the base 18 of the vice 17. The head 28 also carries an abutment 30 to engage the end of the workpiece 20 held in the vice 17; the abutment 30 is insulated from the head 28. In this way the vice 18 and the workpiece held therein is effectively insulated from electrical connection with the other vice except through the portion of the workpiece which projects towards the other vice or passes through it.

The screwed rod 29 extends parallel to the guideways 12 of the bed plate and enters a nut 31 which is held from longitudinal movement by being mounted for rotation in a cross bracket 32 which spans the guideways 12 near their end. The nut 31 has worm-wheel teeth cut around its exterior and the bracket 32 also carries bearings for a worm 33 which meshes with the worm-wheel teeth and forms part of a cross shaft 34. The shaft 34 carries a sprocket 35 connected by a chain 36 to a second sprocket 37 mounted on the spindle of a hand wheel 38 (see Figure 2); thus the vice 17 can be moved along the guideways 12 by hand in either direction and this mechanism constitutes a preliminary feed-device connected to the vice 17.

The other vice 16 is shown in Figure 2 as connected by struts 40 to another sliding head 41 mounted on the guideways 12 and rigidly connected to a ram 42 of a hydraulic feed cylinder 43, secured in the opposite end of the bed 11 from the work-gear 32. The hydraulic cylinder 43 is double acting so that it can force the head 41 to move in either direction and is provided with hydraulic supply pipes 44, 45 connected to its two ends. An adjustable stop rod 46 lies in line with the centre part of the head 41 and limits movement of retraction of the ram 42. Two screwed stop rods 47 are provided which enter screwed holes in the sides of the cylinder 43 and pass freely through the head 41. Beyond the head the stop rods are provided with sprockets 48 connected by a chain 49. One of the stop rods 47 has a handle 50 by which it can be rotated. The stop rods 47 can be adjusted by their rotation so that they project to any desired distance from the end of the cylinder 43 and their heads 51 which lie beyond the sliding head 41 serve to limit outward movement of the ram 42. In the end of the ram 42 there is screwed an abutment-bar 52 the end of which serves to engage the end of the work-pieces 20 when these are inserted in the vice 16. In order to suit various sizes of workpiece a number of abutment-bars 52 of different lengths are provided. When the bars are long they may be supported at an intermediate point of their length by a cross bracket 53 mounted on the bed plate and provided with a guidehole through which the bars 52 can slide.

It should be understood that the bars 40 which connect the head 41 with the vice 16 are arranged to be readily removable when desired, as they are not required for all the operations of the machine. To this end they may be secured in place by set-screws 54.

The head 28 which is connected to the hand-moved vice 17 carries a striker 60 the purpose of which is to operate a limit switch. To this end a sliding bar 61 is mounted on the bed plate 11 parallel to the guideways 12, being supported by bearings 62. A spring 63 tends to move the bar 61 to the right as viewed in the figure and an adjustable collar 64 can be set in any desired position along the bar 61, the collar being in the path of the striker 60. Thus the bar 61 will be moved endwise when the striker engages the collar. The end of the bar 61 is bent downwards at 65 and passes through a slot in the bed plate into engagement with a limit switch 148 (shown in Figure 4), the contacts of which are closed when the bar is moved by the striker.

At the other end of the machine the head 41 is provided with a striker 70 which works above two sliding bars 71, 72 which are mounted in a similar way to the bar 61 just described and are provided with stop collars 73, 74 for engagement with the striker. The bar 71 is constrained by a spring 75 to move normally toward the end of the machine bed and is bent down at its other end through a slot 76 to the inside of the machine where it is connected to a sliding interlock bar 77. The other bar 72 has a spring 78 tending to move it away from the end of the machine bed and is bent down through a slot 79 to the interior of the machine where it is connected to a second sliding interlock bar 80. The interlock bars 77, 80 serve to afford automatic co-operation with two hand control levers 81, 82 which determine the operation of the hydraulic control cylinder 43 (of the heavy-pressure feeder) and 21 (of the vice cylinders 16, 17).

Referring to Figure 3, this shows the vices 16, 17 in the position which they occupy when the machine is set up for upsetting a head on the end of a workpiece 20. The vice 16 contains vice jaws 19, 24 as already described but in the vice 17 there is inserted instead of the vice jaws an anvil carrier 85. The anvil carrier 85 has a head 86 on the side which faces toward the vice 16 and a clamping plate 87 which is secured to the carrier 85 by screws 88. The clamping plate 87 is on the opposite side of the vice from the head 86 and the screws 88 serve to draw the head 86 firmly against the vice body. A wedge device 89 is driven in beneath the cylinder 21 so as to keep the ram 22 in its lowermost position and help in clamping the anvil carrier 85 in position. In the anvil carrier there is secured an anvil 90 which is drawn home against a conical seat 91 by means of an axial bolt 92. A water cooling chamber 93 is provided in the anvil and is supplied with cooling water through a pipe 94 passing through the centre of the bolt 92. The cooling water is withdrawn through a pipe 95 from a lateral exhaust chamber 96 located in the anvil carrier 85 close behind the seat 91 and communicating with the cooling chamber 93 by means of a transverse bore in the anvil 90, which bore is not shown in the drawing, as it falls in a different plane from the section shown.

Referring to Figure 4, in this figure the working parts are lettered similarly to the corresponding parts in Figures 1 to 3 but in order to indicate the interconnection of the various parts they have in some cases been displaced from their correct relative positions so that they may all appear clearly in the diagram. The transformer 15 is shown as provided with a secondary winding 100 which is connected to the bases 18 of the vice electrodes 16, 17. The transformer has a primary winding 101 provided with a number of tappings connected to regulator contacts 102 and by selecting the position of a selector arm 103 upon the contacts various secondary voltages become available on the transformer. The range of voltage regulation is sufficient to ensure that a high enough voltage is available for welding when the machine is required for this purpose and also a low enough voltage for forging operations when these are to be carried out. For this purpose the voltage range on the secondary side of the transformer should extend from somewhat below four volts to above eight volts. Any other desired means of regulating the transformer voltage can be adopted providing a suitable range of regulation is thereby provided. The supply means for the transformer current are indicated at 104, 105 and one of them is connected to the transformer through a clapper switch 106 actuated by a magnet 107. Thus the transformer is supplied with current only when the clapper switch is closed by energisation of the magnet 107. The magnet 107 is energized from supply leads 108, 109 through the normally closed contacts 110, 111 of a push button 112 and in series therewith the contacts 113, 114 of a hydraulic switch 115. The hydraulic switch 115 is connected to a supply pipe 116 in which hydraulic pressure is kept up by a pump 117 which supplies the hydraulic elements of the machine. As long as the hydraulic pressure is maintained the switch 115 is kept closed and the clapper switch will therefore be energised, subject to the control of the push button 112. If, however, for any reason the hydraulic pressure should fail the switch 115 opens and the electric supply is automatically put out of operation. This prevents burnt workpieces in the event of hydraulic failure.

A hydraulic control valve box 120 is provided which is supplied with hydraulic pressure from the pump 117 by means of a pipe 121. The valve box is connected by an exhaust pipe 122 to a sump 123 from which the pump 117 draws its supply. The pipes 44, 45 of the hydraulic cylinder 43 are connected to the valve box 120 and the box contains valves under the control of the lever 81 such that when the lever is raised the pipe 44 from the front end of the cylinder will be connected to the pressure supply and the pipe 45 to the back end of the cylinder to exhaust. Thus the ram 42 will be retracted. When the lever 81 is depressed the connections in the valve box 120 reverse and the ram 42 will be advanced. In a similar way the lever 82 controls pipes 130, 131 leading to the control cylinders 21 of the vice electrodes 16, 17. The pipe 130 conveys pressure to open the vices and the pipe 131 conveys pressure to close the vices. The valves in the box 120 which are under the control of the lever 82 are such that when the lever is raised the vices are opened and when it is depressed the vices are closed.

Above the lever 82 for closing the vices 16, 17 there is a sliding latch 135 which is formed on the end of the sliding rod 80 operated by the stop 74 hereinbefore described. Owing to the spring 78, should the lever 82 be depressed the latch 135 moves to the right and comes over the lever 82, holding it down against the action of a return spring 136. If the vice electrodes are closed therefore they will normally remain closed owing to the latch 135 but they will be released automatically upon the striker 70 engaging the stop 74 when the ram 42 reaches its retracted position.

Similarly the rod 71 which carries the stop 73 is connected to a latch 137 and if the lever 81 is depressed so as to cause the ram 42 to advance, the latch 137 is moved to the left, as viewed in Figure 4, by the action of the spring 75 and the latch 137 holds the lever 81 down against the action of a return spring 138. Upon the ram 42 reaching the position at which the striker 70 engages the stop 73 the rod 137 will be released and the lever 81 will rise, reversing the movement of the ram. The stop 73 therefore determines the limit of forward movement of the ram 42 and secures its automatic return. In addition to being released by the action of stop 73, the latch 137 can be released by means of a bellcrank lever 139, one arm of which works between pins on the stem of the latch 137 and the other arm of which carries a solenoid core 140 working in a solenoid coil 141. The coil 141 is capable of being energised from the supply terminal 109 through contacts 142, 143 which are closed by the push button 112 when it is depressed to break the circuit of the contactor 107. Consequently operation of the push button 112 will not only cut off the electric current but lead to a return movement of the ram 42 should this be advancing at the time when the push button is operated.

The lever 81 is also provided with a solenoid core 145 having a coil 146 so that in addition to being depressed by hand it can be pulled down automatically in certain circumstances. The connection of the coil 146 proceeds from the supply terminal 108 through the coil and thence through a limit switch 147 to the limit switch contacts 148 which are closed by engagement of the stop 64 by the striker 60 on the head 28 of the hand-operated preliminary feed mechanism. The limit switch 147 is such that the circuit is completed when the parts are in the position shown in the drawing with the latch 137 moved to the right to allow the lever 81 to occupy its upper position, in which the ram 42 is moved rearwardly. Should the latch 137 be moved to the left, the circuit is broken at the switch 147.

The lever 81, moreover, carries an interlock arm 150 which is mounted on an upstanding pivot on the lever 81 and can be swung by means of a handle 151 so that it overlies the lever 82. When in this position depression of the lever 81 will cause simultaneous depression of the lever 82 and thus the ram 42 will be advanced and the vices 16, 17 simultaneously closed. If the ram 150 is swung out of the way, however, the depression of the lever 82 to close the vices becomes independent of depression of the lever 81 to advance the ram.

In the operation of this machine, if electric welding is to be effected the transformer 15 is adjusted to give a suitable welding voltage and two workpieces 20 to be welded together are held in the vices 16, 17 by depression of the hand lever 82, the ends of the workpieces which are to be welded being slightly separated and the other ends engaging respectively the abutments 30 and 52. A preliminary feed movement is carried out by means of the handwheel 38 which advances the vice 17 and with it its workpiece until the two workpieces touch one another. The usual burning off operation is then effected by keeping the vices appropriately adjusted until the ends of the workpieces have reached a suitable heat. This involves a gradual feeding of the vice 17 toward the vice 16, and, if the stop 64 is suitably adjusted beforehand, when the burning off operation is complete and the parts are ready to be welded, the limit switch contacts 148 will be closed, thus operating the solenoid 146 and causing the ram 42 of the heavy-pressure feeder mechanism to advance and push the workpiece 20 through the jaws of the vice 16 against the workpiece which is held in the vice 17 with a heavy pressure, thus completing the weld. As soon as the operator sees that the weld is complete, he depresses the push button 112 thus cutting off the electric current and, through the contacts 142, 143, actuating the solenoid 141 which releases the latch 137 and permits lever 81 to rise, returning the ram 42 to its initial position. During these operations the lever 82 remains depressed, but can be released by the operator moving the bar 72 in order to free the latch 135. Any number of welding operations on similar pieces can follow one another with great rapidity owing to the semi-automatic action of the parts.

For upsetting a head on the end of a workpiece the anvil 90 is inserted in the vice 17 and the arm 150 is brought into position above the lever 82. Upon insertion of a workpiece in the vice 16 and depression of the lever 81 by the operator, the vice 16 will be automatically closed and the ram 42 advanced simultaneously. As soon as forging temperature is reached, upsetting will commence against the anvil 90. If a large head is required the operator can retract the anvil by working the handle 38 during the upsetting operation. As soon as the striker 70 engages the stop 73, which is suitably set beforehand, the lever 81 would be freed by movement of the latch 137 and will rise, thus reversing the movement of the ram. The operator will simultaneously cut off the current by the aid of the push button 112. If desired he can employ the push button 112 for releasing the latch 137 also, instead of using the stop 73. As soon as the ram 42 reaches its fully retracted position, the striker 70 will engage the stop 74 and release the lever 82, thus opening the vices and permitting the workpiece to be removed. Any number of similar upset heads can be produced in rapid succession in this manner.

If a series of upsets on workpieces are required which are to be produced at an intermediate point in the length of the workpieces, this is done by using the same vice jaws as are used for welding, so that the appropriate part of the workpiece which is to be upset lies between the vice jaws, and then proceeding in the same way as for upsetting a head on the end of a workpiece.

If it is desired to effect a drawing operation on a workpiece, the workpiece is mounted between the vice jaws in the same way as for upsetting a head at an intermediate point along its length and the bars 40 which unite the vice 16 to the head 41 are put in place. The lever 81 is depressed before the vice jaws of the vices 16, 17 are closed so as to ensure that the head 41 is in its fully extended position. The arm 150 is, during this operation, swung out of the way so that the vice jaws can be closed separately when the ram 42 has been fully advanced. The workpiece will now become heated between the electrodes. When the operator sees that the appropriate forging temperature has been reached, he depresses the push button 112, thus cutting off the heating current and preventing the work from becoming heated further and at the same time operating the solenoid 141 to release the latch 137 and permit the lever 81 to rise. The ram 42 will thereupon move to the left and draw the vice 16 away from the vice 17, pulling the workpiece out to an extent which may be limited by the stop 46, or may proceed until it is drawn apart and two pointed workpieces formed.

If desired instead of allowing the operator to judge the forging temperature, some form of temperature-responsive device may be located close to the workpiece between the vices 16, 17 and connected to the solenoid 141 so as to operate it automatically.

Thus stretch-forging, intermediate upsets, end upsets and welds can all be expeditiously and efficiently effected on this machine.

It will be understood that although a hand-fed mechanism has been described for the vice 17, it would be possible to employ any other form of feed, such as a light hydraulic feed under hand control, in its place.

When tension forging operations are conducted with the described machine it is desirable to increase the hydraulic pressure so as to ensure a secure grip of the vices upon the workpieces, without slipping.

I claim:

1. In a butt-welding machine, the combination with a base, of a pair of workpiece supports mounted on said base for relative movement toward and away from each other, means supplying welding current to said supports, preliminary feeding means for moving one of said supports toward the other to engage the workpieces and to apply relatively light pressure therebetween, feeding means for engaging and applying heavy pressure to the workpiece carried by the other of said supports to displace such workpiece with respect to the support toward and into welding union with the other workpiece, and means operable on completion of movement of said first named support to a predetermined position automatically to initiate operation of said second named feeding means.

2. In a combined butt-welding and forging machine, the combination with a base, of a pair of workpiece supports mounted on said base for relative movement toward and away from each other, means supplying welding current to said supports, preliminary feeding means for moving one of said supports toward the other to engage the workpieces and to apply relatively light pressure therebetween, feeding means for engaging and applying heavy pressure to the workpiece carried by the other of said supports to displace such workpiece with respect to the support toward and into welding union with the other workpiece, and means operable on completion of movement of said first named support to a predetermined position automatically to initiate operation of said second named feeding means, said current supply means including a variable voltage transformer the voltage variation of which is such as to permit said machine to be used for both welding and forging operations.

EMERIC GASPAR.